(12) United States Patent
Han et al.

(10) Patent No.: US 11,454,749 B2
(45) Date of Patent: Sep. 27, 2022

(54) ELECTRONIC DEVICE HAVING HOUSING

(71) Applicant: Samsung Electronics Co., Ltd., Suwon-si (KR)

(72) Inventors: Soonho Han, Suwon-si (KR); Yoojin Kim, Suwon-si (KR); Hyunggon Lee, Suwon-si (KR); Jongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 16/734,032

(22) Filed: Jan. 3, 2020

(65) Prior Publication Data
US 2020/0221589 A1 Jul. 9, 2020

(30) Foreign Application Priority Data
Jan. 4, 2019 (KR) .......................... 10-2019-0001133

(51) Int. Cl.
*G02B 5/04* (2006.01)
*G02B 27/01* (2006.01)

(52) U.S. Cl.
CPC ............. *G02B 5/045* (2013.01); *G02B 27/01* (2013.01)

(58) Field of Classification Search
CPC ................................ G02B 5/045; G02B 27/01
See application file for complete search history.

(56) References Cited

U.S. PATENT DOCUMENTS

| | | | |
|---|---|---|---|
| 6,815,070 B1 * | 11/2004 | Burkle | .................... C03C 17/30 427/166 |
| 8,771,532 B2 | 7/2014 | Carlson et al. | |
| 9,604,434 B2 | 3/2017 | Oh et al. | |
| 2011/0089010 A1 | 4/2011 | Hsu et al. | |
| 2014/0127442 A1 | 5/2014 | Ryu et al. | |

(Continued)

FOREIGN PATENT DOCUMENTS

| | | |
|---|---|---|
| CN | 101777588 A | 7/2010 |
| CN | 107683055 A | 2/2018 |
| CN | 107879638 A | 4/2018 |

(Continued)

OTHER PUBLICATIONS

Supplementary European Search Report dated Nov. 10, 2021, in connection with European Application No. 20736022.3, 24 pages.

(Continued)

*Primary Examiner* — Anne M Hines

(57) ABSTRACT

An electronic device includes a housing including a first plate, a second plate facing away from the first plate, and a lateral member surrounding a space between the first plate and the second plate; a display visible through at least part of the first plate; and a glass construction constructing at least part of the second plate. The glass construction includes a glass plate including a first face outwardly facing the housing and a second face facing away from the first face, an inorganic layer including a first roughness and constructed on the first face, a first polymer layer disposed between the first plate and the second face, an Optically Clear Adhesive (OCA) layer disposed between the second face and the first polymer layer, and a second polymer layer disposed between the first plate and the first polymer layer and including a third face and a fourth face.

20 Claims, 13 Drawing Sheets

(56) References Cited

U.S. PATENT DOCUMENTS

2018/0054904 A1    2/2018   Dejneka et al.
2018/0260055 A1    9/2018   Kim et al.

FOREIGN PATENT DOCUMENTS

| EP | 3062190 A1 | 8/2016 |
|---|---|---|
| KR | 10-2011-0137820 A | 12/2011 |
| KR | 101214524 B1 | 12/2012 |
| KR | 10-2014-0010765 A | 1/2014 |
| KR | 10-2014-0057127 A | 5/2014 |
| KR | 10-2017-0022519 A | 3/2017 |
| WO | 2019076283 A1 | 4/2019 |

OTHER PUBLICATIONS

International Search Report dated Apr. 22, 2020 in connection with International Patent Application No. PCT/KR2020/000131, 3 pages.
Written Opinion of the International Searching Authority dated Apr. 22, 2020 in connection with International Patent Application No. PCT/KR2020/000131, 5 pages.

\* cited by examiner

ELECTRONIC DEVICE HAVING HOUSING

CROSS-REFERENCE TO RELATED APPLICATION

This application is based on and claims priority under 35 U.S.C. 119 to Korean Patent Application No. 10-2019-0001133 filed on Jan. 4, 2019 in the Korean Intellectual Property Office, the disclosure of which is herein incorporated by reference in its entirety.

BACKGROUND

1. Field

Various embodiments of the disclosure relate to a housing of an electronic device.

2. Description of Related Art

At least part of a housing of an electronic device may be constructed of synthetic resin or a glass material.

At least part of the housing may implement a visual haze feeling due to a scattering effect of light by applying and curing a coating liquid to an outer face through a wet spray to constitute a roughness, e.g., a fine uneven structure, on an outer surface.

However, when the haze feeling is implemented by constructing a high roughness in at least part of the housing of the electronic device, there may be a throughput deterioration such as a stain or the like occurring in processes. An increase in a surface roughness may lead to a decrease in strength of a wear resistance (including a coating layer), and there may be a difference in the roughness, compared to a degree of roughness implemented through sanding or etching. For another example, when the haze feeling is applied to a surface of an external glass plate directly through sanding or etching, it may be vulnerable to impact strength

SUMMARY

Various embodiments of the disclosure may provide an electronic device which implements an additional haze feeling in a film structure included in at least part of a housing, thereby implementing various haze feelings, securing productivity, and reducing a wear resistance deterioration.

An electronic device according to various embodiments of the disclosure may include a housing including a first plate, a second plate facing away from the first plate, and a lateral member surrounding a space between the first plate and the second plate, a display visible through at least part of the first plate, and a glass construction constructing at least part of the second plate. The glass construction may include a glass plate including a first face outwardly facing the housing and a second face facing away from the first face, an inorganic layer having a first roughness and constructed on the first face, a first polymer layer disposed between the first plate and the second face, an Optically Clear Adhesive (OCA) layer disposed between the second face and the first polymer layer, and a second polymer layer disposed between the first plate and the first polymer layer and including a third face facing the first polymer layer and a fourth face facing away from the third face and at least in part having a second roughness.

An electronic device according to various embodiments of the disclosure may include a housing including a first plate, a second plate facing away from the first plate, and a lateral member surrounding a space between the first plate and the second plate, a display visible through at least part of the first plate, and a glass construction constructing at least part of the second plate. The glass construction may include a glass plate including a first face outwardly facing the housing and a second face facing away from the first face, an inorganic layer having a first roughness and constructed on the first face, a first polymer layer disposed between the first plate and the second face, an OCA layer disposed between the second face and the first polymer layer, a second polymer layer disposed between the first plate and the first polymer layer and including a third face facing the first polymer layer and a fourth face facing away from the third face, and a third polymer layer including fine particles between the third face and the first polymer layer.

An electronic device according to various embodiments of the disclosure may include a housing including a first plate and a second plate facing away from the first plate, and a display visible through at least part of the first plate. The second plate may include a glass plate including a first face facing in an outward direction of the housing and a second face facing in an inward direction, which is opposite to the outward direction, of the housing, wherein a first roughness is constructed on the first face, and a decoration layer attached to the second face of the glass plate. The decoration layer may include a first polymer layer constructed between the glass plate and the first plate, and a second polymer layer including a third face facing in the outward direction of the housing and a fourth face facing in the inward direction, which is opposite to the outward direction, of the housing and having a second roughness, and constructed between the first polymer layer and the first plate.

According to the disclosure, a roughness structure having an uneven shape can be constituted in a film attached to at least part of a housing of an electronic device, thereby implementing various haze feelings, improving productivity, and reducing a wear resistance deterioration.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
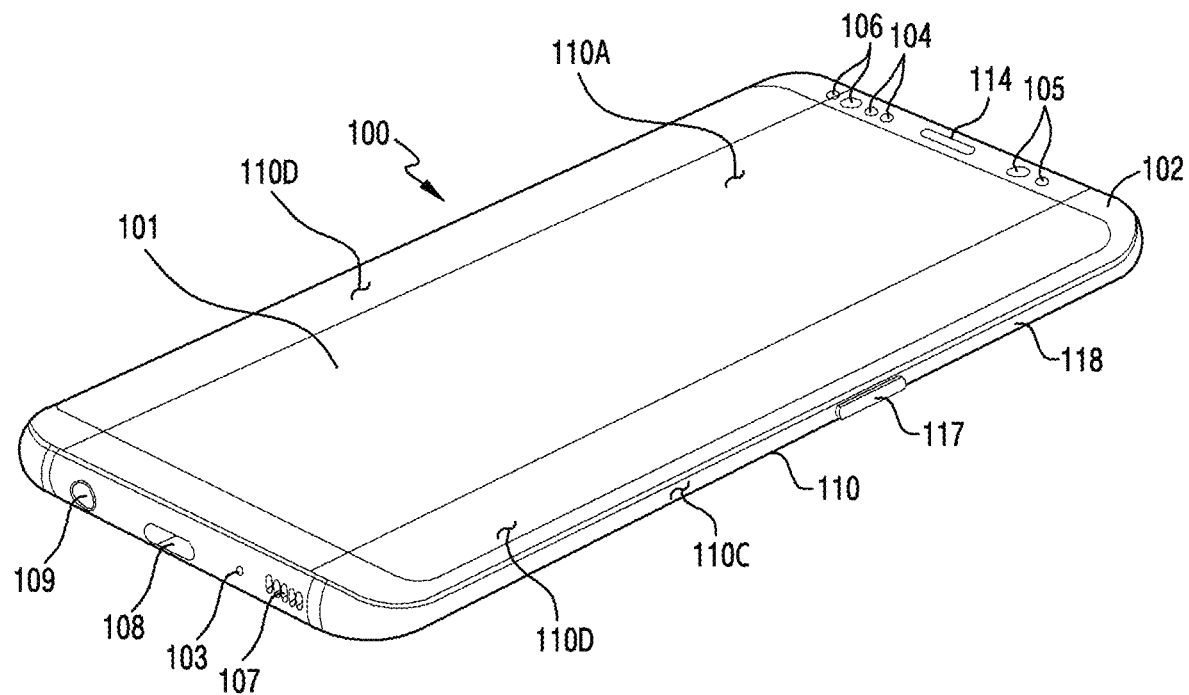
FIG. 1 is a perspective view illustrating a front face of a mobile electronic device according to an embodiment.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure are described with reference to the accompanying drawings. It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

An electronic device according to various embodiments of the disclosure may include at least one of, for example, a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., smart glasses, a Head-Mounted Display (HMD), electronic clothes, an electronic bracelet, an electronic necklace, an electronic appcessory, an electronic tattoo, a smart mirror, or a smart watch).

Figure 2:
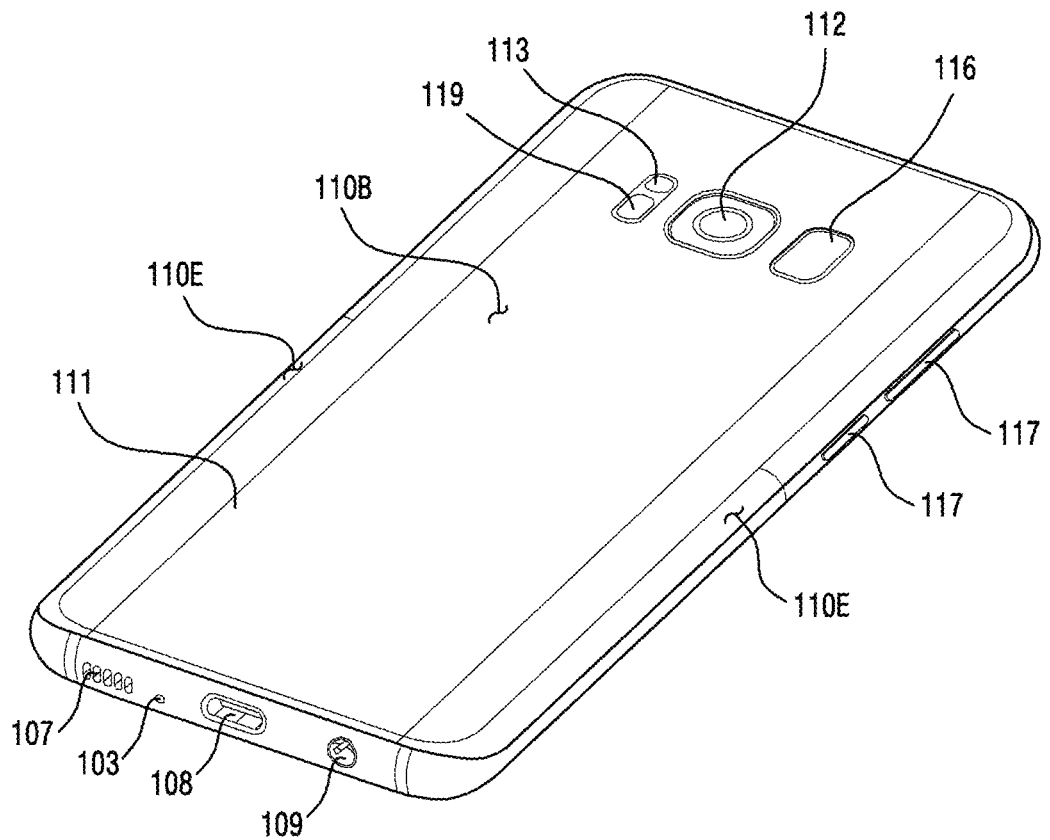
FIG. 2 is a perspective view illustrating a rear face of the electronic device of FIG. 1.

FIG. 1 is a perspective view illustrating a front face of a mobile electronic device according to an embodiment. FIG. 2 is a perspective view illustrating a rear face of the electronic device of FIG. 1.

Referring to FIG. 1 and FIG. 2, an electronic device 100 according to an embodiment may include a housing 110 including a first face (or a front face) 110A, a second face (or a rear face) 110B, and a lateral face 110C surrounding a space between the first face 100A and the second face 110B. In another embodiment (not shown), the housing may refer to a structure which constitutes part of the first face 110A, second face 110B, and third face 110C of FIG. 1. According to an embodiment, the first face 110A may be constructed of a front plate 102 (e.g., a polymer plate or a glass plate having various coating layers) which is at least partially transparent in practice. The second face 110B may be constructed of a rear plate 111 which is opaque in practice. For example, the rear plate 111 may be constructed of coated or colored glass, ceramic, polymer, metallic materials (e.g. aluminum, stainless steel (STS), or magnesium) or a combination of at least two of these materials. The lateral face 110C may be constructed of a lateral bezel structure (or a lateral member) 118 bonded to the front plate 102 and the rear plate 111 and including metal and/or polymer. In some embodiments, the rear plate 111 and the lateral bezel structure 118 may be constructed integrally and may include the same material (e.g., a metallic material such as aluminum).

In the illustrated embodiment, the front plate 102 may include two first regions 110D seamlessly extended by being bent from the first face 110A toward the rear plate 111 at both ends of a long edge of the front plate 102. In the illustrated embodiment (see FIG. 2), the rear plate 111 may include two second regions 110E seamlessly extended by being bent from the second face 110B toward the front plate 102 at both ends of a long edge. In some embodiments, the front plate 102 (or the rear plate 111) may include only one of the first regions 110D (or the second regions 110E). In another embodiment, some of the first regions 110D or the second regions 110E may not be included. In the above embodiments, in a lateral view of the electronic device 100, the lateral bezel structure 118 may have a first thickness (or width) at a lateral face in which the first regions 110D or the second regions 110E are not included, and may have a second thickness thinner than the first thickness at a lateral face in which the first regions 110E or the second regions 110E are included.

According to an embodiment, the electronic device 100 may include at least one or more of a display 101, audio modules 103, 107, and 114, sensor modules 104, 116, and 119, camera modules 105, 112, and 113, a key input device 117, a light emitting element 106, and connector holes 108 and 109. In some embodiments, the electronic device 100 may omit at least one of components (e.g., the key input device 117 or the light emitting element 106), or other components may be additionally included.

The display 101 may be exposed through, for example, some portions of the front plate 102. In some embodiments, at least part of the display 101 may be exposed through the first face 110A and the front plate 102 constructing the first regions 110E of the lateral face 110C. In some embodiments, a corner of the display 101 may be constructed to be substantially the same as an outer boundary adjacent to the front plate 102. In another embodiment (not shown), in order to expand an area in which the display 101 is exposed, the display 101 and the front plate 102 may be constructed to have substantially the same interval between outer boundaries thereof.

In another embodiment (not shown), a portion of a screen display region of the display 101 may have a recess or opening, and may include at least one or more of the audio module 114, sensor module 104, camera module 105, and light emitting element 106 which are aligned with the recess or the opening may be included. In another embodiment (not shown), at least one of the audio module 114, the sensor module 104, the camera module 105, the fingerprint sensor 116, and the light emitting element 106 may be included in a rear face of the screen display region of the display 101. In another embodiment (not shown), the display 101 may be disposed adjacent to or joined with a touch sensing circuit, a pressure sensor capable of measuring touch strength (pressure), and/or a digitizer for detecting a magnetic-type stylus pen. In some embodiments, at least part of the sensor modules 104 and 119 and/or at least part of the key input device 117 may be disposed to the first regions 110D and/or the second regions 110E.

The audio modules 103, 107, and 114 may include the microphone hole 103 and the speaker holes 107 and 114. The microphone hole 103 may have a microphone disposed inside thereof to acquire external sound, and in some embodiments, may have a plurality of microphones disposed to sense a sound direction. The speaker holes 107 and 114 may include the external speaker hole 107 and the communication receiver hole 114. In some embodiments, the speaker holes 107 and 114 and the microphone hole 103 may be implemented with one hole, or the speaker may be included without the speaker holes 107 and 114 (e.g., a Piezo speaker).

The sensor modules 104, 116, and 119 may generate an electrical signal or data value corresponding to an internal operational state of the electronic device 100 or an external environmental state. The sensor modules 104, 116, and 119 may include, for example, the first sensor module 104 (e.g., a proximity sensor) and/or second sensor module (not shown) (e.g., a fingerprint sensor) disposed to the first face 110A of the housing 110, and/or the third sensor module 119 (e.g., a Heart Rate Monitoring (HRM) sensor) disposed to the second face 110B of the housing 110 and/or the fourth sensor module 116 (e.g., a fingerprint sensor). The fingerprint sensor may be disposed not only to the first face 110A (e.g., the display 101) but also the second face 110B of the housing 110. The electronic device 100 may further include at least one of sensor modules (not shown), for example, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, and an illuminance sensor.

The camera modules 105, 112, and 113 may include the first camera device 105 disposed to the first face 110A of the electronic device 100, the second camera device 112 disposed to the second face 110B, and/or the flash 113. The camera module 105 and 112 may include one or more lenses, an image sensor, and/or an image signal processor. The flash 113 may include, for example, a Light Emitting Diode (LED) or a xenon lamp. In some embodiments, two or more lenses (wide angle and telephoto lenses) and image sensors may be disposed to one face of the electronic device 100.

The key input device 117 may be disposed to the lateral face 110C of the housing 110. In another embodiment, the electronic device 100 may not include the entirety or part of the aforementioned key input device 117. The key input device 117, which is not included, may be implemented on a display 101 in a different form such as a soft key or the like. In some embodiments, the key input device may include the sensor module 116 disposed to the second face 110B of the housing 110.

The light emitting element 106 may be disposed, for example, to the first face 110A of the housing 110. The light emitting element 106 may provide, for example, state information of the electronic device 100 in an optical form. In another embodiment, the light emitting element 106 may provide, for example, a light source interworking with an operation of the camera module 105. The light emitting element 106 may include, for example, an LED, an IR LED, and a xenon lamp.

The connector holes 108 and 109 may include the first connector hole 108 capable of housing a connector (e.g., a USB connector) for transmitting/receiving power and/or data of an external electronic device and/or the second connector hole (e.g., earphone jack) 109 capable of housing a connector for transmitting/receiving an audio signal with respect to the external electronic device.

Figure 3:
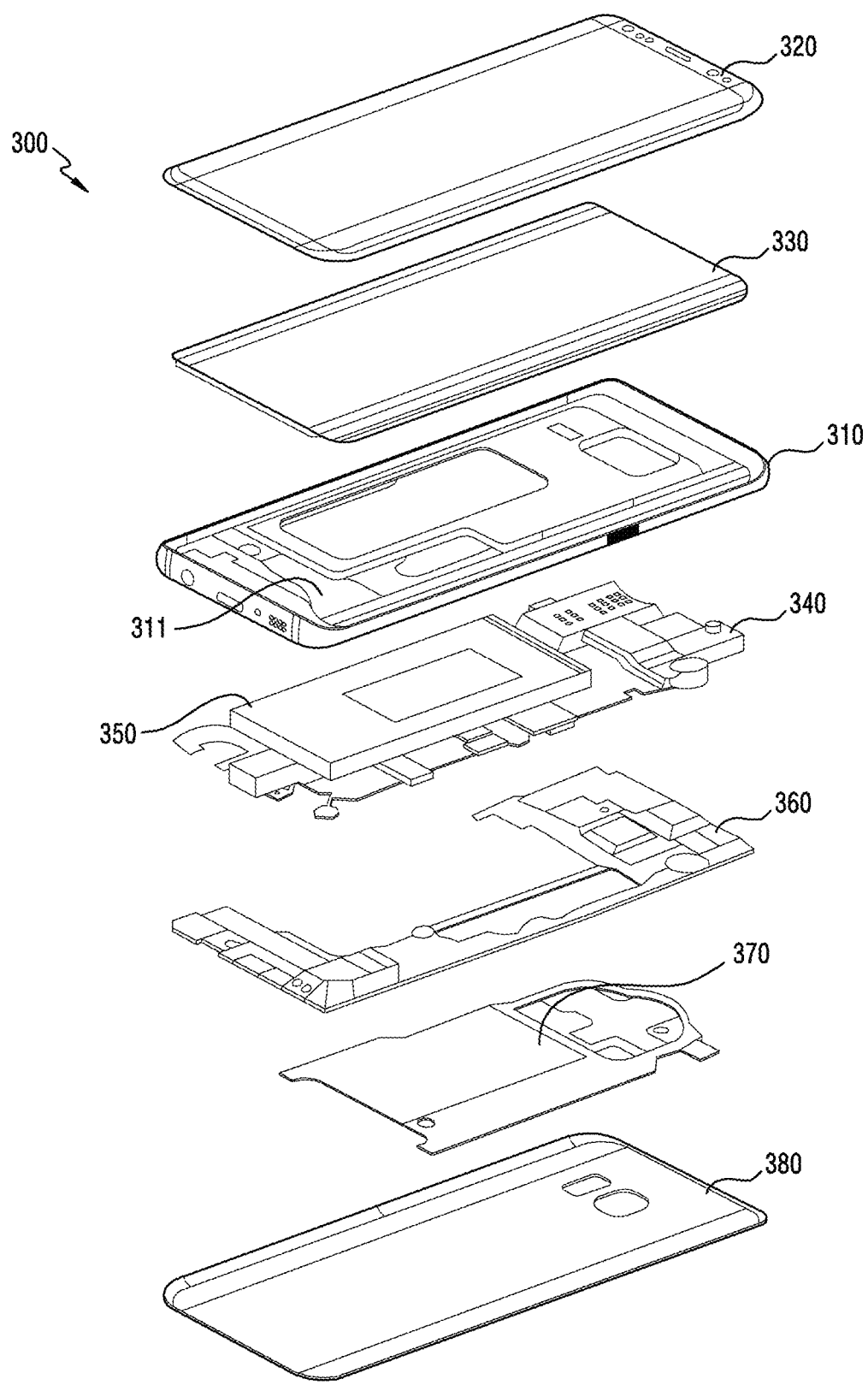
FIG. 3 is an exploded perspective view illustrating an inner structure of the electronic device of FIG. 1.

FIG. 3 is an exploded perspective view illustrating an inner structure of the electronic device of FIG. 1.

Referring to FIG. 3, an electronic device 300 may include a lateral bezel structure 310, a first support member 311 (e.g., a bracket), a front plate 320, a display 330, a Printed Circuit Board (PCB) 340, a battery 350, a second support member 360 (e.g., a rear case), an antenna 370, and a rear plate 380. In some embodiments, the electronic device 300 may omit at least one (e.g., the first support member 311) of these components, or may additionally include other components. At least one of the components of the electronic device 300 may be the same as or similar to at least one of the components of the electronic device 100 of FIG. 1 or FIG. 2, and redundant descriptions will be omitted hereinafter.

The first support member 311 may be coupled with the lateral bezel structure 310 by being disposed inside the electronic device 300, or may be constructed integrally with respect to the lateral bezel structure 310. The first support member 311 may be constructed of, for example, a metal material and/or non-metal material (e.g., polymer). The display 330 may be coupled to one side of the first support member 311, and the PCB 340 may be coupled to the other side thereof. A processor, a memory, and/or an interface may be mounted on the PCB 340. The processor may include, for example, one or more of a central processing unit, an application processor, a graphic processing unit, an image signal processor, a sensor hub processor, and a communication processor.

The memory may include, for example, a volatile memory or a non-volatile memory.

The interface may include, for example, a High Definition Multimedia Interface (HDMI), a Universal Serial Bus (USB) interface, a Secure Digital (SD) card interface, and/or an audio interface. For example, the interface may electrically or physically couple the electronic device 300 and the external electronic device, and may include a USB connector, an SD card/MMC connector, or an audio connector.

As a device for supplying power to at least one component of the electronic device 300, the battery 350 may include, for example, a non-rechargeable primary cell, a rechargeable secondary cell, or a fuel cell. At least one portion of the battery 350 may be disposed on the same plane substantially with respect to, for example, the PCB 340. The battery 350 may be disposed integrally inside the electronic device 300, or may be detachably disposed with respect to the electronic device 300.

The antenna 370 may be disposed between the rear plate 380 and the battery 350. The antenna 370 may include, for example, a Near Field Communication (NFC) antenna, a wireless charging antenna, and/or a Magnetic Secure Transmission (MST) antenna. The antenna 370 may perform NFC, for example, with the external electronic device, or may wirelessly transmit/receive power used for charging. In another embodiment, an antenna structure may be constructed by at least part of the lateral bezel structure 310 and/or the first support member 311 or a combination thereof.

Figure 4A:
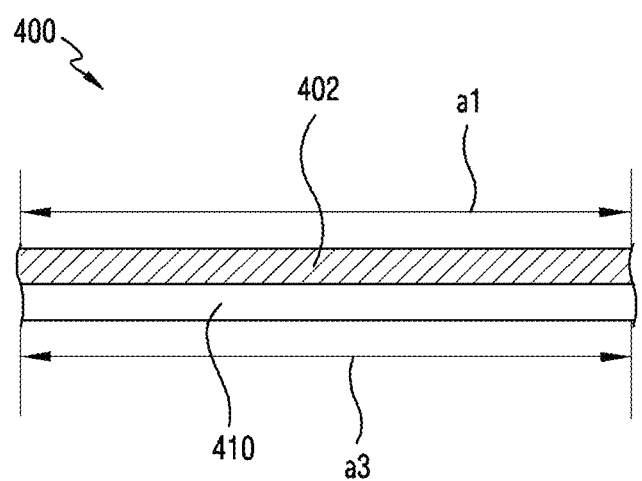
FIG. 4A is a cross-sectional view illustrating a structure of a rear plate according to various embodiments of the disclosure.
Figure 4B:
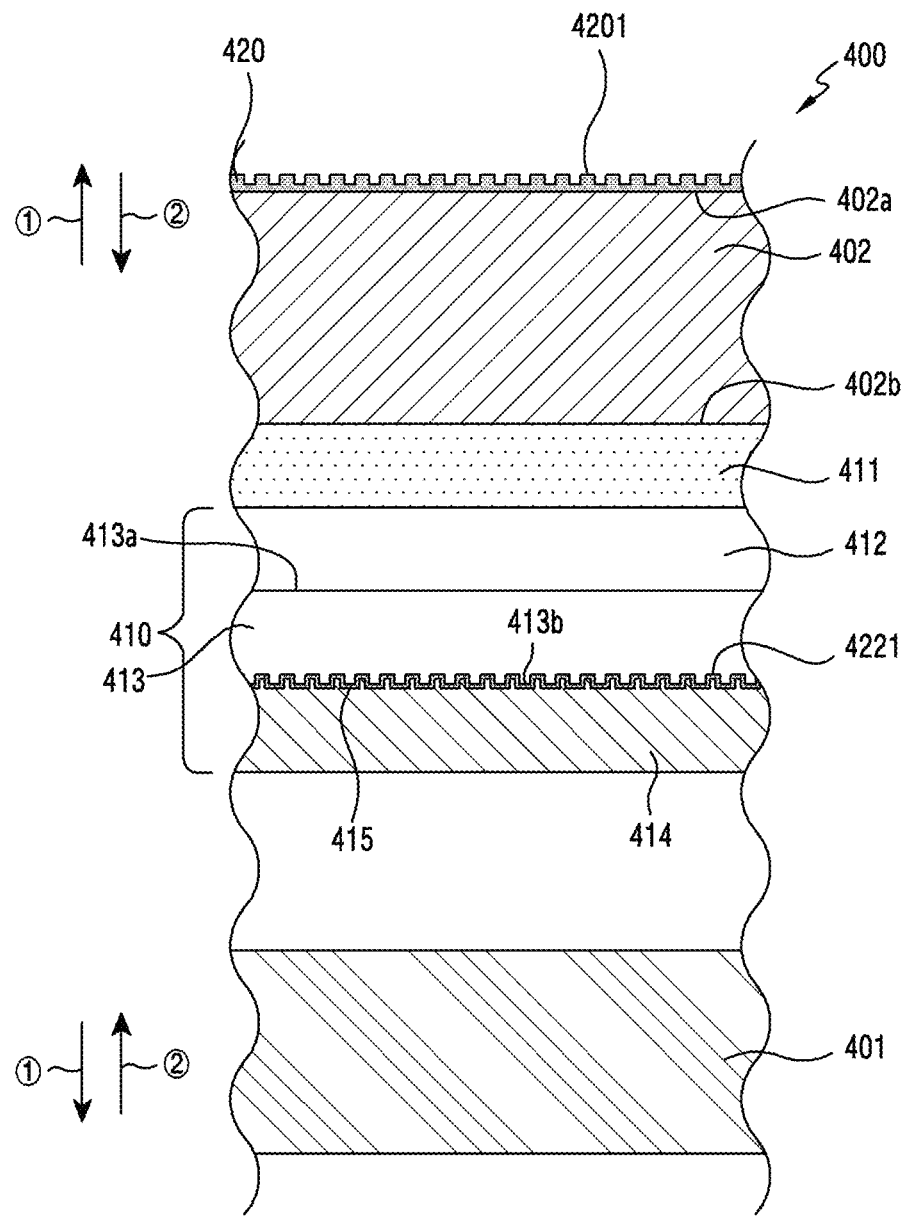
FIG. 4B is a cross-sectional view illustrating a structure of a glass construction constituting part of a rear plate according to various embodiments of the disclosure.

FIG. 4A is a cross-sectional view illustrating a structure of a rear plate according to various embodiments of the disclosure. FIG. 4B is a cross-sectional view illustrating a structure of a glass construction constituting part of a rear plate according to various embodiments of the disclosure.

Referring to FIG. 4A, a glass construction 400 according to an embodiment may constitute at least part of a front plate or rear plate. According to an embodiment, the glass construction 400 may include a flat portion, a curved portion, or a combination thereof. It is shown in FIG. 4A that the glass construction 400 is applied to a flat portion a1 of the rear plate.

According to an embodiment, the glass construction 400 to be manufactured may include a decoration layer 410 included in a glass plate 402. According to an embodiment, a flat portion a3 may be included since the decoration layer 410 is included in the glass plate 402. For example, the decoration layer 410 may be implemented with a film or printing.

Referring to FIG. 4B, a glass construction 400 according to an embodiment may be a laminated construction constituted in at least one region of the rear plate of the electronic device. The glass construction 400 according to an embodiment may include a glass plate 402, an adhesive layer 411, and a decoration layer 410. The decoration layer 410 may be attached to the glass plate 402 by means of the adhesive layer 411.

According to an embodiment, the glass construction 400 may include an inorganic layer 420 having a first roughness 4201 constructed on one face of the glass plate 402 and a second polymer layer 413 (e.g., a UV molding layer) having a second roughness 4221. As a fine first uneven structure, the first roughness 4201 may be constructed on a face facing in an outward direction ① of the inorganic layer 420. As a fine second uneven structure, the second roughness 4221 may be constructed on one face of the second polymer layer 413. For example, each of the first and second uneven structures may be constructed in a regular or irregular shape as a fine uneven shape. The first roughness 4201 and the second roughness 4221 may be constructed identically or differently. The inorganic layer 420 including the first roughness 4201 may be a roughness layer.

The aforementioned haze feeling may imply that an outer surface of the housing looks visually hazy as if it is foggy.

According to an embodiment, light incident to the inorganic layer 420 may be scattered due to the first roughness 4201, e.g., the fine first uneven structure, thereby providing a visually haze feeling. According to an embodiment, the first roughness 4201, e.g., the fine uneven structure, of the first inorganic layer 420 may be constructed by using any one of a physical sanding process, a chemical etching process, and a coating or spray scheme.

According to an embodiment, the glass plate 402 may constitute at least part of the rear plate. The glass plate 402 may include a first face 402a facing in an outward direction ① of the housing and a second face 402b facing in an inward direction ② opposite to the first face 402a.

According to an embodiment, the decoration layer 410 may be attached to the second face 402b of the glass plate 402 by means of the adhesive layer 411. For example, the adhesive layer 411 may be an Optically Clear Adhesive (OCA) material. According to an embodiment, the decoration layer 410 may include at least one of a first polymer layer 412, the second polymer layer 413, a first layer 414 (e.g., a printed layer), and a second layer 415 (e.g., a deposition layer).

According to an embodiment, the first polymer layer 412 may be constructed between the first plate 401 and the second face 402b, as a transparent material. According to an embodiment, the second polymer layer 413 may be disposed between the first plate 401 and the first polymer layer 412. For example, the first polymer layer 412 may include any one of a Poly Ethylene Terephthalate (PET), Poly Methyl Methacrylate (PMMA), and Poly Carbonate (PC).

According to an embodiment, as a transparent material, the second polymer layer 413 may include a third face 413a facing the first polymer layer 412, and a fourth face 413b facing away from the third face 413a and at least in part having the second roughness 4221. The third face 413a may be a face facing in the outward direction ①, and the fourth face 413b may be a face facing in the inward direction ②. For example, the second polymer layer 413 may be constructed of a UV molding material which is synthetic resin to which an acrylate double bond is applied, or which includes any one of acrylate and polyurethane.

According to an embodiment, the first layer 414 may be disposed between the fourth face 413b and the first plate 401. For example, the first layer 414 may express color, as a printed layer. For another example, the first layer 414 may be a shielding layer, as an opaque layer.

According to an embodiment, the second layer 415 may be disposed between the second polymer layer 413 and the first layer 414. For example, the second layer 415 may include a reflective material to express a metal texture. According to an embodiment, the second layer 415 may be deposited on the fourth face 413b of the second polymer layer 413. For example, the second layer 415 may include any one of titanium oxide ($Ti_3O$), silicon dioxide ($SiO_2$), and/or indium (In).

According to an embodiment, the second roughness 4221 may be constructed on the fourth face 413b of the second polymer layer 413 to provide a second haze feeling. Light incident to the second roughness 4221 according to an embodiment may be scatted due to a second uneven structure, thereby providing a visually haze feeling.

According to an embodiment, the second roughness 4221 which provides the haze feeling may be produced by implementing an uneven structure on a surface of a UV molding mold through a sanding or etching scheme, and performing UV molding by using the mold, followed by multi-deposition and printing. The UV molding mold may be applied without a pattern (with a flat face) or with various optical patterns. The second roughness 4221 providing the haze feeling according to an embodiment may be manufactured in a coating manner.

According to an embodiment, the glass plate 402 and the decoration layer 410 may be subjected to respective processes to implement the first roughness 4201 and the second roughness 4221 respectively, and thereafter may be subjected to a lamination process to constitute the glass construction 400 as a final object.

Figure 5:
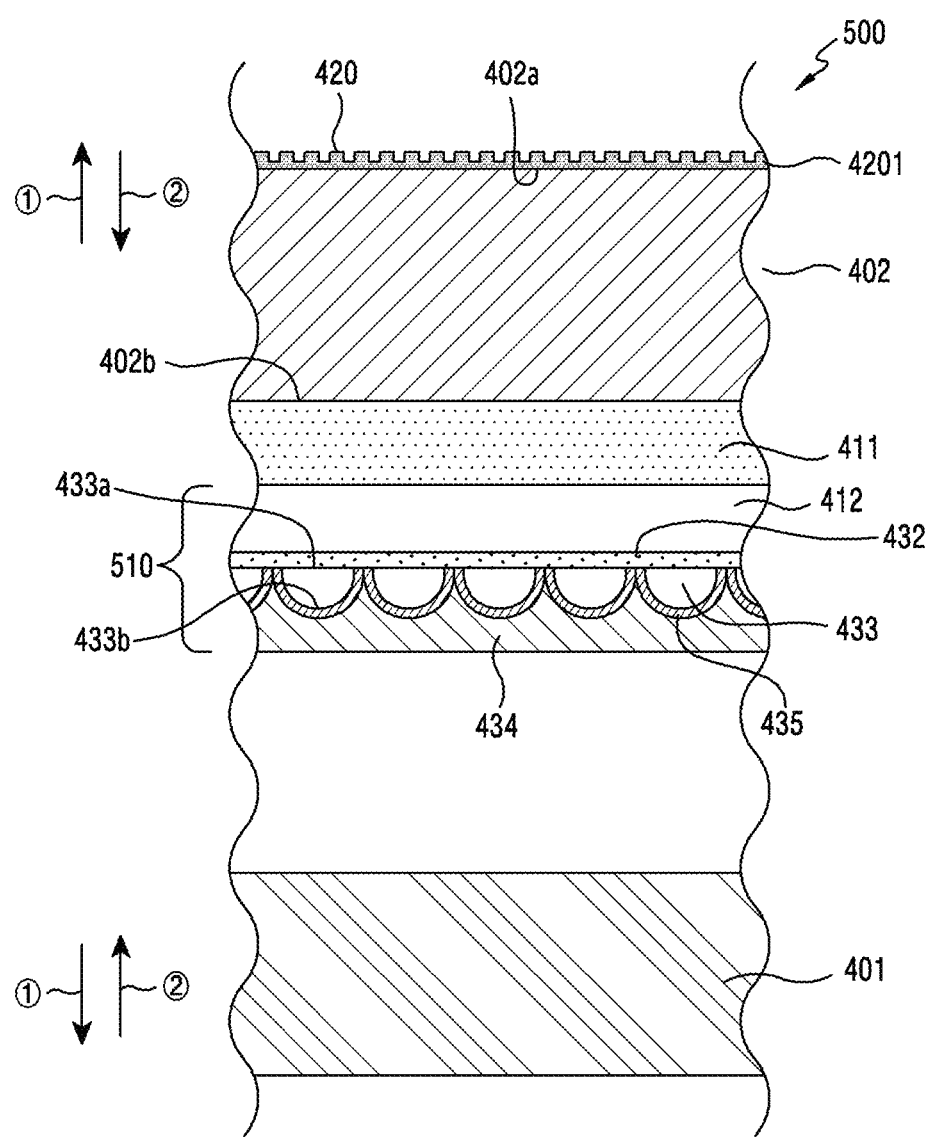
FIG. 5 is a cross-sectional view illustrating a structure of another glass construction constructing part of a rear plate according to various embodiments of the disclosure.

FIG. 5 is a cross-sectional view illustrating a structure of another glass construction constructing part of a rear plate according to various embodiments of the disclosure.

Referring to FIG. 5, a glass construction 500 (e.g., the glass construction 400 of FIG. 4B) according to various embodiments will be described only when there is a difference compared to the glass construction 400 of FIG. 4, and descriptions of the rest identical structure will be omitted to avoid redundancy. A glass plate 402 and inorganic layer 420 of the glass construction 500 of FIG. 5 may have substantially the same structure as the glass plate 402 and inorganic layer 420 of the glass construction 400 of FIG. 4.

According to an embodiment, the glass construction 500 may include a decoration layer 510 attached to a second face 402b of the glass plate 402. The decoration layer 510 according to an embodiment may be attached to a second face 402b of the glass plate 402 by means of an adhesive layer 411.

According to an embodiment, the decoration layer 510 may include at least one of a first polymer layer 412, a second polymer layer 433, a third polymer layer 432, a first layer 434, and a second layer 435.

The first polymer layer 412 according to an embodiment may be constructed between a first plate 401 and the second face 402b, as a transparent material. For example, the first polymer layer 412 may include any one of PolyEthylene Terephthalate (PET), Poly Methyl MethAcrylate (PMMA), and Poly Carbonate (PC).

According to an embodiment, the second polymer layer 433 may be disposed between the first plate 401 and the first polymer layer 412. According to an embodiment, the second polymer layer 433 may include at least one pattern. According to an embodiment, each of the at least one pattern is a molding pattern, and, for example, may be arranged equidistantly. For example, a cross section of each pattern has a shape projecting in an inward direction ①, and may be approximately semi-circular. According to an embodiment, each pattern may be constructed equidistantly in the inward direction ① on a fourth face 433b of the second polymer layer 433.

According to an embodiment, the second polymer layer 433 may include a third face 433a facing the first polymer layer 412 and the fourth face 433b facing the second layer 435. The third face 433a may be a flat face, and the fourth face 433b may include a curved face. The third face 433a may be a face facing in an outward direction ②, and the fourth face 433b may be a face facing in the inward direction ①. For example, the second polymer layer 433 may be a layer constructed of a UV molding material which is synthetic resin to which an acrylate double bond is applied, or which includes any one of acrylate and polyurethane.

According to an embodiment, the first layer 434 may be disposed between the fourth face 433b and the first plate 401. The first layer 434 may express color, as a printed layer. The first layer 434 may be a shielding layer, as an opaque layer.

According to an embodiment, the second layer 435 may be disposed between the second polymer layer 433 and the first layer 434. For example, the second layer 435 may include a reflective material to express a metal texture. According to an embodiment, the second layer 435 may be deposited on the fourth face 433b (e.g., a curved face) of the second polymer layer 433. For example, the second layer 435 may include any one of titanium oxide ($Ti_3O$), silicon dioxide ($SiO_2$), and/or indium (In).

According to an embodiment, the third polymer layer 432 may be constructed between the first polymer layer 412 and the second polymer layer 433 to provide a second haze feeling. According to an embodiment, the third polymer layer 432 may be constructed as a printed layer on which ink including a plurality of beads is printed. The third polymer layer 432 may implement various haze feelings through a bead shape and content. For example, the third polymer layer 432 may be implemented by designating a region. The third polymer layer 432 including a plurality of beads may be printed before UV molding.

For example, at least one bead included in the third polymer layer 432 may be a cylindrical particle having a diameter of about 6 μm or a spherical particle having a diameter of about 3 μm. A cluster of a plurality of spherical particles (e.g., 0.1 μm~0.2 μm) may have a diameter of about 1 μm.

Figure 6:
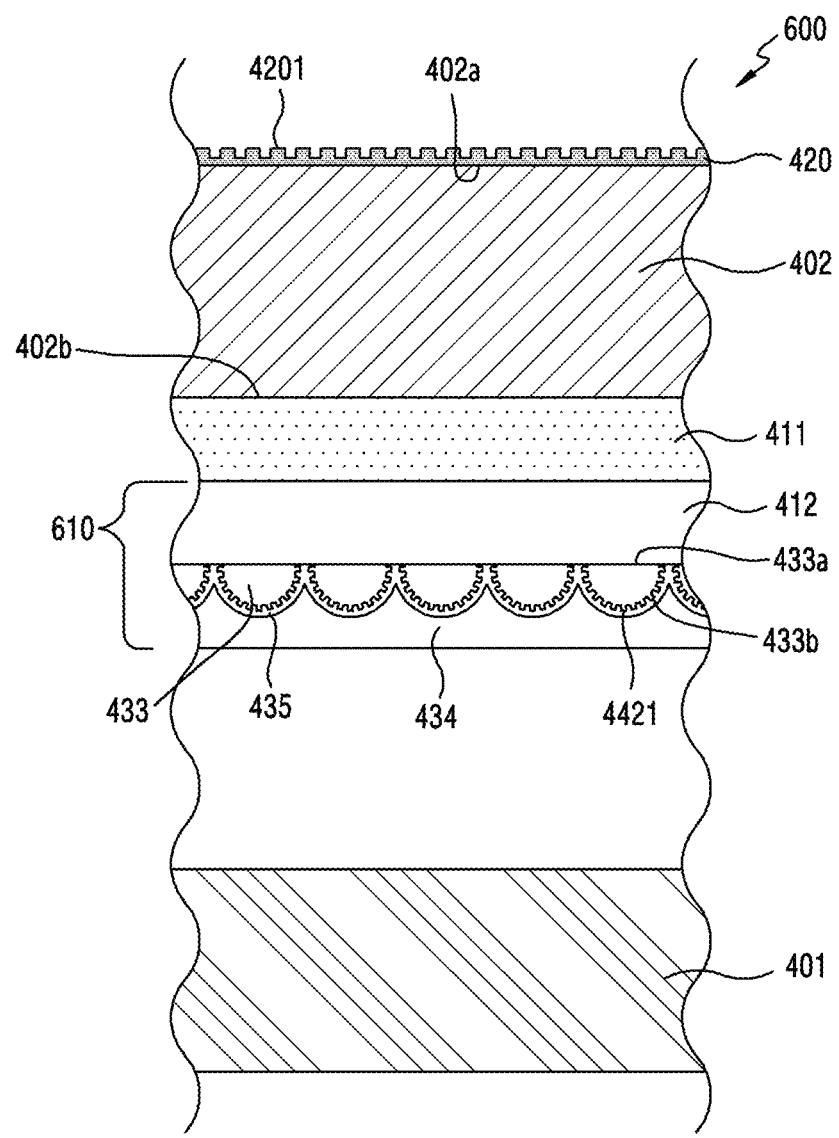
FIG. 6 is a cross-sectional view illustrating a structure of another glass construction constituting part of a rear plate according to various embodiments of the disclosure.

FIG. 6 is a cross-sectional view illustrating a structure of another glass construction constituting part of a rear plate according to various embodiments of the disclosure.

Referring to FIG. 6, a glass construction 600 according to various embodiments will be described only when there is a difference compared to the glass construction 400 of FIG. 4, and descriptions of the rest identical structure will be omitted to avoid redundancy. The glass construction 600 of FIG. 6 is different from the glass construction 400 of FIG. 4B only in terms of a location at which a fourth roughness 4421 is constructed, and the rest of the structure is the same. Therefore, redundant descriptions will be omitted.

According to an embodiment, the glass construction 600 may include a second polymer layer 433 including at least one pattern. For example, the patterns may be arranged equidistantly. A third face 433a of the second polymer layer 433 may be a flat face, and a fourth face 433b may be a curved face.

According to an embodiment, the fourth roughness 4421 may be constructed between a first layer 434 and the second polymer layer 433 to provide a haze feeling. According to an embodiment, the fourth roughness 4421 may be constructed such that an uneven structure faces in a direction of the first plate 401. Incident light according to an embodiment may be scatted due to the fourth roughness 4421, thereby providing a visually haze feeling. According to an embodiment, the fourth roughness 4421 may be constructed on the fourth face 433b of the second polymer layer 433.

According to an embodiment, the fourth roughness 4421 may provide a haze feeling by implementing an uneven structure on a surface of a UV molding mold to express the haze feeling through a sanding or etching scheme, and performing UV molding by using the mold, followed by multi-deposition, or may provide the haze feeling by being constructed through coating. The UV molding mold may be applied without a pattern (with a flat face) or with various optical patterns.

According to an embodiment, the glass construction may implement various types of multi-haze feelings through a combination of respective embodiments.

For example, a third polymer layer of FIG. 5 (e.g., the third polymer 432 of FIG. 5) may be additionally disposed between first and second polymer layers (e.g., the first and second polymer layers 412 and 413 of FIG. 4B) of a glass construction of FIG. 4B (e.g., the glass construction 400 of FIG. 4B).

For another example, the third polymer layer of FIG. 5 (e.g., the third polymer 432 of FIG. 5) may be additionally disposed between first and second polymer layers (e.g., first and second polymer layers 412 and 433 of FIG. 6) of a glass construction of FIG. 6 (e.g., the glass construction 600 of FIG. 6).

For another example, at least one bead included in the third polymer layer of FIG. 5 (e.g., the third polymer 432 of FIG. 5) may be included in a printed layer (e.g., the printed layer 434 of FIG. 6) of the glass construction of FIG. 6 (e.g., the glass construction 600 of FIG. 6).

A glass constructions which provides multi-haze feelings according to various embodiments of the disclosure may be manufactured by the following process.

Figure 7:
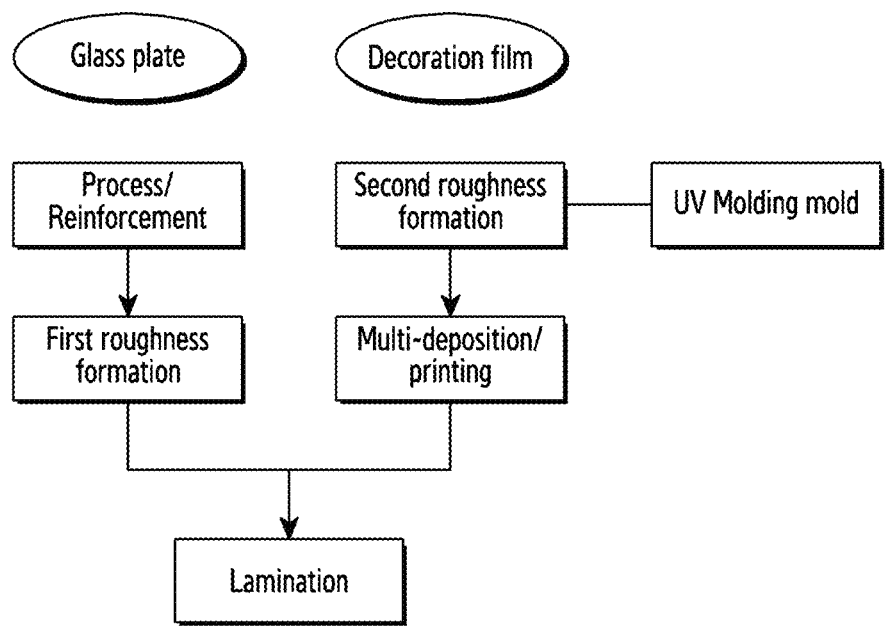
FIG. 7 is a block diagram illustrating a flow of manufacturing a glass construction according to various embodiments of the disclosure.

FIG. 7 illustrates a flow of manufacturing a glass construction according to various embodiments of the disclosure.

Referring to FIG. 7, the glass construction 400 according to various embodiments may be manufactured as a construction which provides multi-haze feelings since the decoration layer 410 having an uneven structure of the second roughness 4221 is laminated through a lamination process on the second face 420b of the glass plate 402 having an uneven structure of the first roughness 4201.

The glass construction 400 according to an embodiment may be reinforced after constructing a plate by processing a glass fabric, and may construct a first roughness layer of an uneven structure on one face of the reinforced glass plate 402. The decoration layer 410 according to an embodiment may construct a second roughness layer of an uneven structure on a surface of a polymer layer by using an ultraviolet molding mold, and a multi-deposition and printing process may be performed. The glass construction 400 may be constructed by laminating the decoration layer 410 on one face of the glass plate 402.

Figure 8:
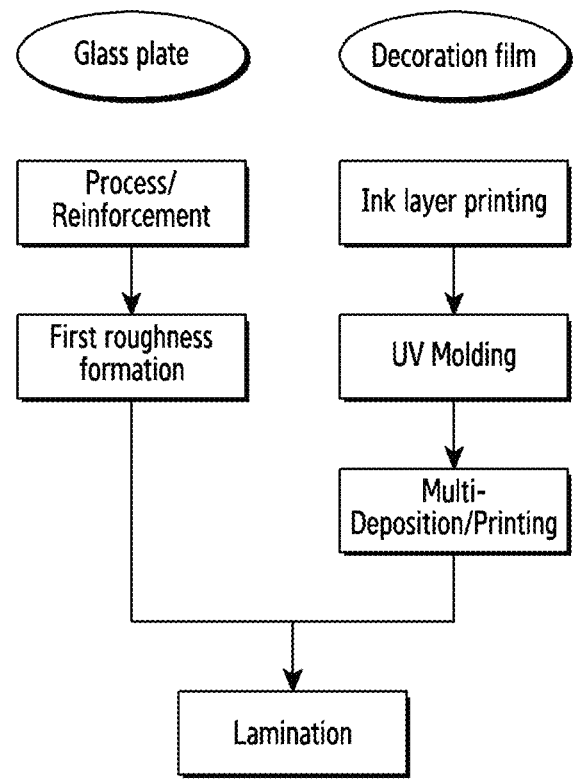
FIG. 8 is a block diagram illustrating a flow of manufacturing a glass construction according to various embodiments of the disclosure.

FIG. 8 illustrates a flow of manufacturing a glass construction according to various embodiments of the disclosure.

Referring to FIG. 8, the glass construction 400 according to various embodiments may be manufactured as a construction which provides multi-haze feelings since the decoration layer 410 having an uneven structure of the second roughness 4221 is integrated with the second face 402b of the glass plate 402 having an uneven structure of the first roughness 4201 through a lamination process.

The glass construction 400 according to an embodiment may be reinforced after constructing a plate by processing a glass fabric, and may construct a first roughness layer of an uneven structure on the first face 402a of the reinforced glass plate 402. The decoration layer 410 according to an embodiment may construct a second roughness layer of an uneven structure by printing ink having a plurality of beams on a surface of a polymer layer, and a multi-deposition and printing process may be performed after a UV molding process. The glass construction 400 may be constructed by laminating the decoration layer 410 on the second face 402b of the glass plate 402.

According to various embodiments of the disclosure, the glass construction 400 may increase a haze feeling for all faces of the glass plate 402, and may partially increase the haze feeing.

FIG. 9 to FIG. 12 illustrate examples in which a haze feeling is partially different in a glass construction according to various embodiments of the disclosure.

Figure 9:
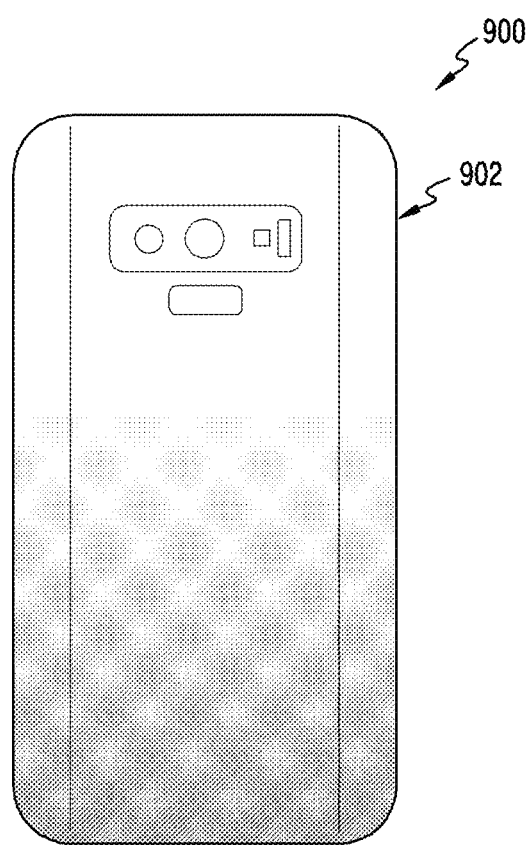
FIG. 9 illustrates examples in which a haze feeling is partially different in a glass construction according to various embodiments of the disclosure.

Referring to FIG. 9, a glass construction 900 (e.g., the glass construction 400 of FIG. 4B) according to various embodiments may provide a gradation effect of a haze feeling having directivity. For example, the gradation effect of the haze feeling may be provided to a glass plate 902 (e.g., the glass plate 402 of FIG. 4B) from top to bottom, from bottom to top, from left to right, from right to left, or in a diagonal direction.

Figure 10:
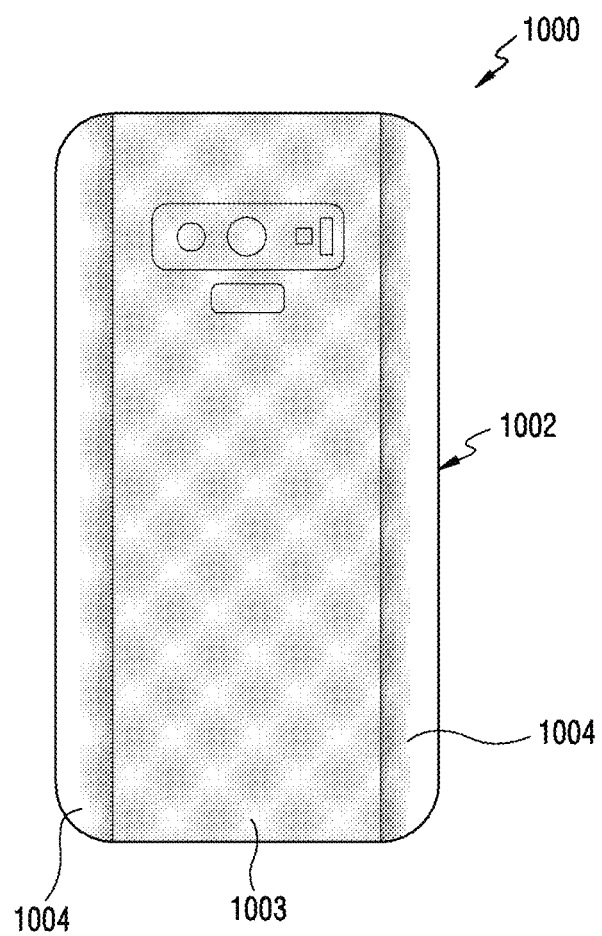
FIG. 10 illustrates examples in which a haze feeling is partially different in a glass construction according to various embodiments of the disclosure.

Referring to FIG. 10, a glass construction 1000 (e.g., the glass construction 400 of FIG. 4B) according to various embodiments may provide a different gradation haze feeling for each region. For example, a glass plate 1002 (e.g., the glass plate 402 of FIG. 4B) may provide a haze feeling which gives different gradation effects to a flat region 1003 and an edge region 1004.

Figure 11:
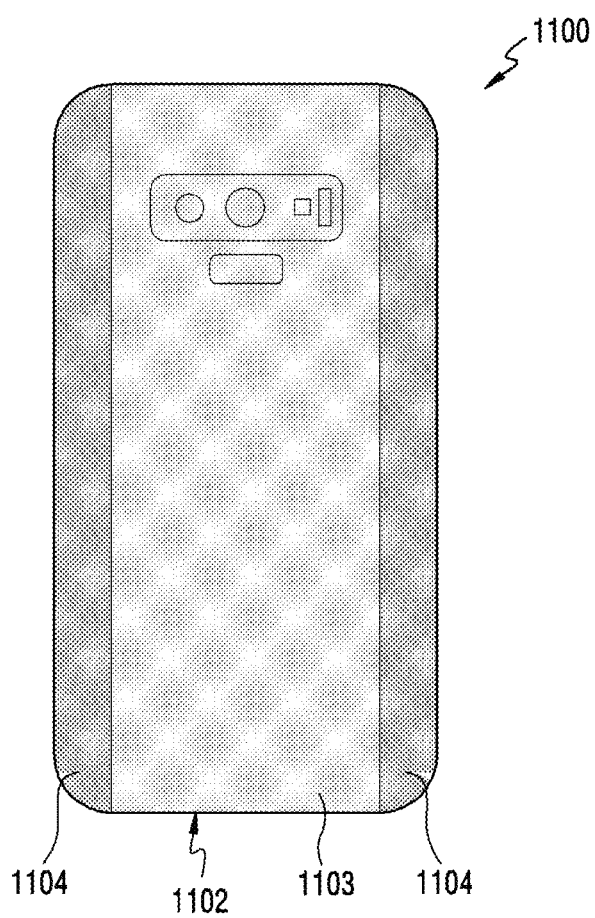
FIG. 11 illustrates examples in which a haze feeling is partially different in a glass construction according to various embodiments of the disclosure.

Referring to FIG. 11, a glass construction 1100 (e.g., the glass construction 400 of FIG. 4B) according to various embodiments may provide a different haze feeling for each region. For example, a glass plate 1102 (e.g., the glass plate 402 of FIG. 4B) may provide different haze feelings in a flat region 1103 and an edge region 1104.

Figure 12:
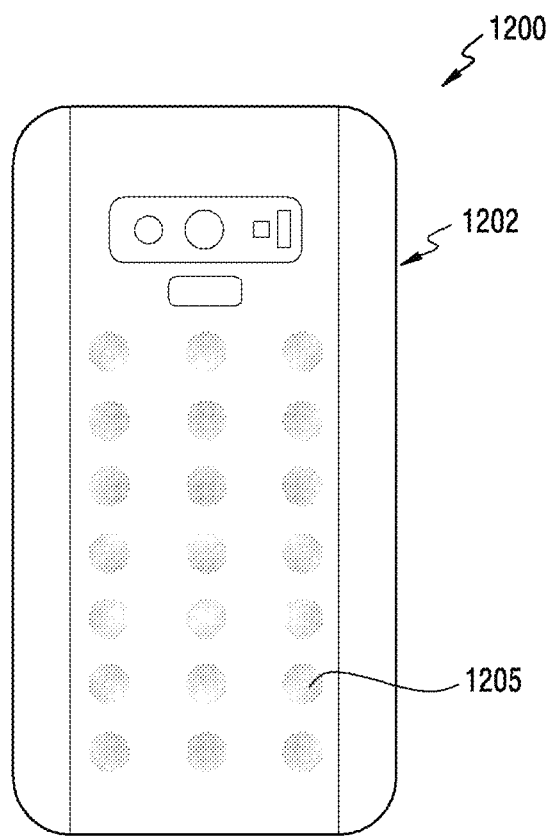
FIG. 12 illustrates examples in which a haze feeling is partially different in a glass construction according to various embodiments of the disclosure.

Referring to FIG. 12, a glass construction 1200 (e.g., the glass construction 400 of FIG. 4B) according to various embodiments may implement various shapes of patterns by adjusting a haze feeling. For example, a pattern 1205 of a haze feeling, which is constructed on a glass plate 1202 (e.g., the glass plate 402 of FIG. 4B), may include a shape in which a specific pattern is regularly repeated or an irregular shape.

In addition thereto, a glass construction according to various embodiments can be implemented with a differentiated design through a roughness layer of various haze feelings and coordination with multi-deposition of the roughness layer.

According to an embodiment, an electronic device (e.g., the electronic device 100 of FIG. 1) may include a housing (e.g., the housing 110 of FIG. 1) including a first plate (e.g., the front plate 102 of FIG. 1), a second plate (e.g., the rear plate 111 of FIG. 2) facing away from the first plate, and a lateral member (e.g., the lateral member 118 of FIG. 1) surrounding a space between the first plate and the second plate, a display (e.g., the display 101 of FIG. 1) visible through at least part of the first plate, and a glass construction (e.g., the glass construction 400 of FIG. 4) constructing at least part of the second plate. The glass construction may include a glass plate (e.g., the glass plate 402 of FIG. 4B) including a first face (e.g., the first face 402a of FIG. 4B) outwardly facing the housing and a second face (e.g., the second face 402b of FIG. 4B) facing away from the first face, an inorganic layer (e.g., the inorganic layer 420 of FIG. 4B) having a first roughness (e.g., the first roughness 4201 of FIG. 4B) and constructed on the first face, a first polymer layer (e.g., the first polymer layer 412 of FIG. 4B) disposed between the first plate and the second face, an Optically Clear Adhesive (OCA) layer (e.g., the adhesive layer 411 of FIG. 4B) disposed between the second face and the first polymer layer, and a second polymer layer (e.g., the second polymer layer 413 of FIG. 4B) disposed between the first plate and the first polymer layer and including a third face (e.g., the third face 413a of FIG. 4B) facing the first polymer layer and a fourth face (e.g., the fourth face 413b of FIG. 4B) facing away from the third face and at least in part having a second roughness (e.g., the second roughness 4221 of FIG. 4B).

According to an embodiment, the glass construction (e.g., the glass construction 400 of FIG. 4B) may further include a first layer (e.g., the first layer 414 of FIG. 4B) including an opaque material between the fourth face (e.g., the fourth face 413b of FIG. 4B) and the first plate (e.g., the first plate 401 of FIG. 4B).

According to an embodiment, the electronic device may further include a second layer (e.g., the second layer 415 of FIG. 4B) including a reflective material between the second polymer layer (e.g., the second polymer layer 413 of FIG. 4B) and the first layer (e.g., the first layer 414 of FIG. 4B).

According to an embodiment, the second layer (e.g., the second layer 415 of FIG. 4B) may include titanium oxide ($Ti_3O$), silicon dioxide ($SiO_2$), and/or indium (In).

According to an embodiment, the electronic device may further include at least one pattern on the fourth face (e.g., the fourth face 413b of FIG. 4B).

According to an embodiment, the first polymer layer (e.g., the first polymer layer 412 of FIG. 4B) may include any one of Poly Ethylene Terephthalate (PET), Poly Methyl Methacrylate (PMMA), and Poly Carbonate (PC).

According to an embodiment, the second polymer layer (e.g., the second polymer layer 413 of FIG. 4B) may include any one of acrylate and polyurethane.

According to an embodiment, an electronic device (e.g., the electronic device 100 of FIG. 1) may include a housing (e.g., the housing 110 of FIG. 1) including a first plate (e.g., the front face 102 of FIG. 1), a second plate (e.g., the rear plate 111 of FIG. 2) facing away from the first plate, and a lateral member (e.g., the lateral member 118 of FIG. 1) surrounding a space between the first plate and the second plate, a display (e.g., the display 101 of FIG. 1) visible through at least part of the first plate, and a glass construction (e.g., the glass construction 500 of FIG. 5) constructing at least part of the second plate. The glass construction may include a glass plate (e.g., the glass construction 402 of FIG. 5) including a first face (e.g., the first face 402a of FIG. 4B) outwardly facing the housing and a second face (e.g., the second face 402b of FIG. 5) facing away from the first face, an inorganic layer (e.g., the inorganic layer 420 of FIG. 5) having a first roughness (e.g., the first roughness 4201 of FIG. 5) and constructed on the first face, a first polymer layer (e.g., the first polymer layer 412 of FIG. 5) disposed between the first plate and the second face, an Optically Clear Adhesive (OCA) layer (e.g., the adhesive layer 411 of FIG. 5) disposed between the second face and the first polymer layer, a second polymer layer (e.g., the second polymer layer 433 of FIG. 5) disposed between the first plate and the first polymer layer and including a third face (e.g., the third face 433a of FIG. 5) facing the first polymer layer and a fourth face (e.g., the fourth face 433b of FIG. 5) facing away from the third face, and a third polymer layer (e.g., the third polymer layer 432 of FIG. 5) including fine particles between the third face and the first polymer layer.

According to an embodiment, the glass construction (e.g., the glass construction 500 of FIG. 5) may further include a first layer (e.g., the first layer 434 of FIG. 5) including an opaque material between the fourth face (e.g., the fourth face 433b of FIG. 5) and the first plate (e.g., the first plate 401 of FIG. 5).

According to an embodiment, the electronic device may further include a second layer (e.g., the second layer 435 of FIG. 5) including a reflective material between the second polymer layer (e.g., the second polymer layer 433 of FIG. 5) and the first layer (e.g., the first layer 434 of FIG. 5).

According to an embodiment, the second layer (e.g., the second layer 435 of FIG. 5) may include titanium oxide ($Ti_3O$), silicon dioxide ($SiO_2$), and/or indium (In).

According to an embodiment, the second polymer layer (e.g., the second polymer layer 433 of FIG. 5) may include at least one pattern on the fourth face (e.g., the fourth face 433b of FIG. 5).

According to an embodiment, an electronic device (e.g., the electronic device 100 of FIG. 1) may include a housing (e.g., the housing 110 of FIG. 1) including a first plate (e.g., the front plate 102 of FIG. 1) and a second plate (e.g., the rear plate 111 of FIG. 2) facing away from the first plate, and a display (e.g., the display 101 of FIG. 1) visible through at least part of the first plate. The second plate (e.g., the rear plate 111 of FIG. 2) may include a glass plate (e.g., the glass plate 402 of FIG. 6) including a first face (e.g., the first face 402a of FIG. 5) facing in an outward direction (e.g., an outward direction ① of FIG. 4B) of the housing and a second face (e.g., the second face 402b of FIG. 5) facing in an inward direction (e.g., the inward direction ② of FIG. 4B), which is opposite to the outward direction, of the housing, wherein a first roughness (e.g., the first roughness 4201 of FIG. 6) is constructed on the first face, and a decoration layer (e.g., the decoration layer 610 of FIG. 6) attached to the second face of the glass plate. The decoration layer may include a first polymer layer (e.g., the first polymer layer 412 of FIG. 6) constructed between the glass plate and the first plate, and a second polymer layer including a third face (e.g., the third face 433a of FIG. 6) facing in the outward direction (e.g., the outward direction ① of FIG. 4B) of the housing and a fourth face (e.g., the fourth face 433b of FIG. 6) facing in the inward direction (e.g., the inner direction ② of FIG. 4B), which is opposite to the outward direction, of the housing and having a second roughness, and constructed between the first polymer layer and the first plate.

According to an embodiment, the second polymer layer (e.g., the second polymer layer 433 of FIG. 6) may include at least one pattern protruding in the inward direction.

According to an embodiment, the at least one pattern may include an uneven shape, and the second roughness may include a fine uneven shape.

According to an embodiment, the glass plate (e.g., the glass plate 402 of FIG. 6) may include a flat face (e.g., the flat face a1 of FIG. 4A) or a curved face (e.g., the curved face a2 of FIG. 4A) or a combination thereof.

According to an embodiment, the second plate may further include a printed layer (e.g., the first layer 434 of FIG. 6) including an opaque material between the fourth face (e.g., the fourth face 433b of FIG. 6) and the first plate (e.g., the first plate 401 of FIG. 6).

According to an embodiment, the electronic device may further include a reflective layer (e.g., the second layer 435 of FIG. 6) between the second polymer layer (e.g., the fourth roughness 4421 of FIG. 6) and the printed layer (e.g., the first layer 434 of FIG. 6).

According to an embodiment, the second roughness (e.g., fourth second roughness 4421 of FIG. 6) may be constructed in at least one selected region of the fourth face (e.g., the fourth face 433*b* of FIG. 6).

According to an embodiment, the second roughness (e.g., fourth second roughness 4421 of FIG. 6) may be constructed between the second polymer layer (e.g., the second polymer layer 433 of FIG. 6) and the printed layer (e.g., the first layer 434 of FIG. 6).

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing comprising a first plate, a second plate facing away from the first plate, and a lateral member surrounding a space between the first plate and the second plate;
a display visible through at least part of the first plate; and
a glass construction constructing at least part of the second plate and comprising:
a glass plate comprising a first face outwardly facing the housing and a second face facing away from the first face;
an inorganic layer including a first roughness and constructed on the first face;
a first polymer layer disposed between the first plate and the second face;
an Optically Clear Adhesive (OCA) layer disposed between the second face and the first polymer layer; and
a second polymer layer disposed between the first plate and the first polymer layer and comprising:
a third face facing the first polymer layer, and
a fourth face facing away from the third face and at least in part including a second roughness.

2. The electronic device of claim 1, wherein the glass construction further comprises a first layer comprising an opaque material between the fourth face and the first plate.

3. The electronic device of claim 2, further comprising a second layer comprising a reflective material between the second polymer layer and the first layer.

4. The electronic device of claim 3, wherein the second layer comprises at least one of titanium oxide (Ti$_3$O), silicon dioxide (SiO$_2$), or indium (In).

5. The electronic device of claim 1, further comprising at least one pattern on the fourth face.

6. The electronic device of claim 1, wherein the first polymer layer comprises at least one of Poly Ethylene Terephthalate (PET), Poly Methyl Methacrylate (PMMA), or Poly Carbonate (PC).

7. The electronic device of claim 1, wherein the second polymer layer comprises at least one of acrylate or polyurethane.

8. An electronic device comprising:
a housing comprising a first plate, a second plate facing away from the first plate, and a lateral member surrounding a space between the first plate and the second plate;
a display visible through at least part of the first plate; and
a glass construction constructing at least part of the second plate and comprising:
a glass plate comprising a first face outwardly facing the housing and a second face facing away from the first face;
an inorganic layer including a first roughness and constructed on the first face;
a first polymer layer disposed between the first plate and the second face;
an Optically Clear Adhesive (OCA) layer disposed between the second face and the first polymer layer;
a second polymer layer disposed between the first plate and the first polymer layer and comprising:
a third face facing the first polymer layer, and
a fourth face facing away from the third face; and
a third polymer layer comprising fine particles between the third face and the first polymer layer.

9. The electronic device of claim 8, wherein the glass construction further comprises a first layer comprising an opaque material between the fourth face and the first plate.

10. The electronic device of claim 9, further comprising a second layer comprising a reflective material between the second polymer layer and the first layer.

11. The electronic device of claim 10, wherein the second layer comprises at least one of titanium oxide (Ti$_3$O), silicon dioxide (SiO$_2$), or indium (In).

12. The electronic device of claim 8, wherein the second polymer layer comprises at least one pattern on the fourth face.

13. An electronic device comprising:
a housing comprising a first plate and a second plate facing away from the first plate; and
a display visible through at least part of the first plate,
wherein the second plate comprises:
a glass plate comprising a first face facing in an outward direction of the housing and a second face facing in an inward direction of the housing, wherein the inward direction is opposite to the outward direction and a first roughness is constructed on the first face; and
a decoration layer attached to the second face of the glass plate,
wherein the decoration layer comprises:
a first polymer layer constructed between the glass plate and the first plate; and
a second polymer layer comprising:
a third face facing in the outward direction of the housing, and
a fourth face facing in the inward direction of the housing and including a second roughness, wherein the inward direction is opposite to the outward direction and the fourth face is constructed between the first polymer layer and the first plate.

14. The electronic device of claim 13, wherein the second polymer layer comprises at least one pattern protruding in the inward direction.

15. The electronic device of claim 14, wherein the at least one pattern comprises an uneven shape.

16. The electronic device of claim 13, wherein the glass plate comprises at least one of a flat face or a curved face.

17. The electronic device of claim 13, wherein the second plate further comprises a printed layer comprising an opaque material between the fourth face and the first plate.

18. The electronic device of claim 17, further comprising a reflective layer between the second polymer layer and the printed layer.

19. The electronic device of claim 13, wherein the second roughness is constructed in at least one selected region of the fourth face.

20. The electronic device of claim 13, wherein first polymer layer comprises at least one of Poly Ethylene Terephthalate (PET), Poly Methyl Methacrylate (PMMA), or Poly Carbonate (PC).

* * * * *